(12) United States Patent
Hosein et al.

(10) Patent No.: US 7,835,298 B2
(45) Date of Patent: Nov. 16, 2010

(54) METHOD AND SYSTEM FOR OPTIMAL ALLOCATION OF BANDWIDTH AND POWER RESOURCES TO OFDMA VOIP CHANNELS

(75) Inventors: Patrick Hosein, San Diego, CA (US); Quanzhong Gao, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 700 days.

(21) Appl. No.: 11/848,037

(22) Filed: Aug. 30, 2007

(65) Prior Publication Data

US 2008/0212527 A1 Sep. 4, 2008

Related U.S. Application Data

(60) Provisional application No. 60/844,881, filed on Sep. 15, 2006.

(51) Int. Cl.
*H04L 12/26* (2006.01)
*H04B 7/005* (2006.01)
*H04Q 7/00* (2006.01)

(52) U.S. Cl. .................. 370/252; 370/278; 370/328

(58) Field of Classification Search ......... 370/252–255, 370/277, 278, 282, 328, 333
See application file for complete search history.

(56) References Cited

U.S. PATENT DOCUMENTS

| 6,597,705 | B1 * | 7/2003 | Rezaiifar et al. ............ 370/468 |
| 6,987,738 | B2 * | 1/2006 | Subramanian et al. ...... 370/252 |
| 7,433,311 | B1 * | 10/2008 | Kalyanasundaram et al. .... 370/235 |
| 7,664,047 | B2 * | 2/2010 | Hamalainen ................ 370/252 |
| 7,715,323 | B2 * | 5/2010 | Connolly et al. ............ 370/252 |
| 2006/0002338 | A1 * | 1/2006 | Guo ........................... 370/328 |

OTHER PUBLICATIONS

Hosein, P., "Capacity of Packetized Voice Services over Time-Shared Wireless Packet Data Channels," 24th Annual Joint Conference of the IEEE Computer and Communications, INFOCOM 2005, vol. 3, Mar. 13-17, 2005, pp. 2032-2043, IEEE.

Hosein, P., "On the Optimal Allocation of Downlink Resources in OFDM-Based Wireless Networks," Wired/Wireless Internet Connections, vol. 3970, 2006, pp. 202-213, Springer-Verlag, Berlin/Heidelberg.

Hosein, P., "Optimal Allocation of Bandwith and Power Resources to OFDMA VoIP Channels," 2nd International Symposium on Wireless Pervasive Computing, Feb. 5-7, 2007, 4 pages, IEEE.

* cited by examiner

*Primary Examiner*—Hong Cho
(74) *Attorney, Agent, or Firm*—Slater & Matsil, L.L.P.

(57) ABSTRACT

A method and system of allocating a bandwidth and a power for a wireless user. The method includes for an allocated bandwidth determining a transmission power and adjusting the transmission power based on whether a bit rate and an error rate associated with the transmission power and the allocated bandwidth satisfy one or more predetermined criteria. The method further processing information associated with the adjusted transmission power and determining a power level indicator. Additionally, the method includes determining whether the power level indicator satisfies one or more predetermined third criteria. If the power level indicator is determined not to satisfy the one or more predetermined third criteria, the method includes adjusting the allocated bandwidth from the first bandwidth to a second bandwidth for the wireless user. Otherwise, the method includes keeping the allocated bandwidth.

27 Claims, 4 Drawing Sheets

METHOD AND SYSTEM FOR OPTIMAL ALLOCATION OF BANDWIDTH AND POWER RESOURCES TO OFDMA VOIP CHANNELS

CROSS-REFERENCES TO RELATED APPLICATIONS

This application claims priority to U.S. Provisional Patent Application No. 60/844,881, filed on Sep. 15, 2006, commonly assigned, incorporated by reference herein for all purposes.

BACKGROUND OF THE INVENTION

The present invention generally relates to telecommunication techniques. More particularly, the present invention relates to a method and system for allocating bandwidth and power resources for a wireless network user. More specifically, embodiments of the present invention provide a method and system for optimal allocation of bandwidth and power resources to voice-on-internet protocol (VoIP) channels in the forward link of wireless networks using orthogonal frequency domain multiple access (OFDMA) technology. But it would be recognized that the invention has a much broader range of applicability.

Orthogonal Frequency Domain Multiple Access (OFDMA) technology is a multi-user version of the popular Orthogonal Frequency-Division Multiplexing (OFDM) digital modulation scheme. Multiple access is achieved in OFDMA by assigning subsets of subcarriers to individual users, allowing simultaneous low data rate transmission from several users. Based on feedback information about the channel conditions, adaptive user-to-subcarrier assignment can be achieved. If the assignment is done sufficiently fast, this further improves the OFDM robustness to fast fading and narrow-band cochannel interference, and makes it possible to achieve even better system spectral efficiency. Fourth Generation wireless networks will use OFDMA technology in order to provide the high throughput and low latency required for present and future wireless applications.

In a forward link of an OFDMA network, each traffic and control channel within a frame must be allocated power, bandwidth (number of subcarriers) and time (number of OFDMA symbols) resources. This flexibility is one of the advantages of OFDMA but requires more sophisticated resource management than Third Generation networks. Some conventional approaches have focused on the scheduling of power and bandwidth resources over OFDMA channels. Typically, each Subscriber Station (SS) needs to be informed of the bandwidth allocations each time the SS is served. In this way one can take advantage of fast fading and serve users during positive fades. However, such approaches are limited for delay tolerant data traffic and only a subset of users are served at a time.

When the network starts to deal with delay sensitive traffic with near constant bit rate such as VoIP, since all users must be served sufficiently fast to maintain low latencies, signaling resources (needed to indicate which frame resources are meant for which user) can become a significant burden. VoIP is presently supported by allocating a subset of diverse subcarriers to each active voice connection. Then a closed loop power control is used to maintain the frame error rate (FER) at the desired level as is done in traditional CDMA 1X networks. The number of available VoIP channels is fixed and any new connection request is queued if no channels are available. The queuing must be limited to a relative small value otherwise the end to end delay performance would be not acceptable for maintaining the audio stream even with a sizeable buffer.

As seen above, an improved approach by dynamically changing the bandwidth resources over time in addition to changing the power resources for optimally allocating both bandwidth and power to OFDMA VoIP channels is desired. Particularly, an algorithm for obtaining optimal discrete bandwidth allocation as optimal power is achieved for a user channel should provide further system efficiency increase and performance improvement.

BRIEF SUMMARY OF THE INVENTION

The present invention generally relates to telecommunication techniques. More particularly, the present invention relates to a method and system for allocating bandwidth and power resources for a wireless network user. More specifically, embodiments of the present invention provide a method and system for optimal allocation of bandwidth and power resources to voice-on-internet protocol (VoIP) channels in the forward link of wireless networks using orthogonal frequency domain multiple access (OFDMA) technology. But it would be recognized that the invention has a much broader range of applicability.

In a specific embodiment, the present invention provides a method of allocating a bandwidth and a power for a wireless user. The method includes determining an allocated bandwidth to be equal to a first bandwidth, determining a transmission power to be equal to a first power level, transmitting to a wireless user a wireless signal associated with the allocated bandwidth and the transmission power, determining a bit rate and an error rate for the transmitted signal, and processing information associated with the bit rate and the error rate. Additionally, the method includes determining whether the bit rate satisfies one or more predetermined first criteria and whether the error rate satisfies one or more predetermined second criteria. If the bit rate is determined not to satisfy the one or more predetermined first criteria and/or the error rate is determined not to satisfy the one or more predetermined second criteria, the method includes adjusting the transmission power from the first power level to a second power level so that the bit rate is determined to satisfy the one or more predetermined first criteria and the error rate is determined to satisfy the one or more predetermined second criteria. The method further includes processing information associated with the adjusted transmission power, determining a power level indicator based on at least information associated with the adjusted transmission power, and processing information associated with the power level indicator. Moreover, the method includes determining whether the power level indicator satisfies one or more predetermined third criteria. If the power level indicator is determined not to satisfy the one or more predetermined third criteria, the method includes adjusting the allocated bandwidth from the first bandwidth to a second bandwidth for the wireless user. If the power level indicator is determined to satisfy the one or more predetermined third criteria, the method includes keeping the allocated bandwidth equal to the first bandwidth.

In another specific embodiment, the present invention provides a method of allocating a bandwidth and a power for a user connection. The method includes providing a wireless network downlink with a total bandwidth and a total available power. The downlink includes one or more user connections capable of transmitting one or more wireless signals at a constant rate. The method further includes assigning one or more transmission powers respectively for the one or more user connections, where a sum of the one or more transmission powers is no greater than the total available power. Additionally, the method includes determining one or more bandwidth allocations respectively for the one or more user connections. Each of the one or more bandwidth allocations is derived from a corresponding transmission power associated with the constant rate, a channel-gain for the corresponding user connection, and an error rate no greater than a predetermined criterion. The method further includes calculating a remaining power by subtracting a sum of the one or more transmission powers from the total available power and calculating a remaining bandwidth by subtracting a sum of the one or more bandwidth allocations from the total bandwidth. Moreover, the method includes deriving a rate for transmitting a data signal through a connection other than the one or more user connections. The rate is associated with at least the remaining bandwidth and the remaining power. Furthermore, the method includes determining the one or more transmission powers respectively to be one or more first power levels associated with one or more first bandwidth allocations for the one or more user connections so that a maximum value of the rate is obtained subjecting conditions that a sum of the one or more first power levels is no greater than the total available power and a sum of the one or more first bandwidth allocations is no greater than the total bandwidth.

In an alternative embodiment, the present invention provides a system a system of allocating a bandwidth and a power for a wireless user in network downlink. The system includes one or more network components configured to determine an allocated bandwidth to be equal to a first bandwidth, determine a transmission power to be equal to a first power level, transmit to a wireless user a wireless signal associated with the allocated bandwidth and the transmission power, determine a bit rate and an error rate for the transmitted signal, process information associated with the bit rate and the error rate, and determine whether the bit rate satisfies one or more predetermined first criteria and whether the error rate satisfies one or more predetermined second criteria. If the bit rate is determined by the system not to satisfy the one or more predetermined first criteria and/or the error rate is determined not to satisfy the one or more predetermined second criteria, the system further adjusts the transmission power from the first power level to a second power level so that the bit rate is determined to satisfy the one or more predetermined first criteria and the error rate is determined to satisfy the one or more predetermined second criteria. Additionally, the system processes information associated with the adjusted transmission power, determines a power level indicator based on at least information associated with the adjusted transmission power, processes information associated with the power level indicator, and determine whether the power level indicator satisfies one or more predetermined third criteria. If the power level indicator is determined by the system not to satisfy the one or more predetermined third criteria, the system further adjusts the allocated bandwidth from the first bandwidth to a second bandwidth for the wireless user. If the power level indicator is determined by the system to satisfy the one or more predetermined third criteria, the system shall keeps the allocated bandwidth equal to the first bandwidth. In one embodiment, the one or more network components of the system includes a forward link controller.

Many benefits may be achieved using the present invention over existing techniques. For example, for fixed rate traffic, such as VoIP, over a forward link of an OFDMA network, both the power and bandwidth allocations can be varied for improved resources optimization. Certain embodiments of the present invention demonstrate that by optimizing over both power and bandwidth dimensions one can achieve significant performance gains when compared to optimizing over a single dimension, namely power in convention technique. Some embodiments of the invention can be demonstrated by numerical results from computer simulations. Embodiments also provide a simple algorithm for perform two correlated control loops for optimizing the transmission power and bandwidth allocations, without need of costly complex implementation and computing resources. Certain embodiments shows that when multiple VoIP channels are involved, the present invention provides methods of determining optimal capacity with a highest throughput while each channel being in its optimal channel condition. Depending upon the embodiment, one or more of these benefits may be achieved. These and other benefits may be described throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention generally relates to telecommunication techniques. More particularly, the present invention relates to a method and system for allocating bandwidth and power resources for a wireless network user. More specifically, embodiments of the present invention provide a method and resulted system for optimal allocation of bandwidth and power resources to voice-on-internet protocol (VoIP) channels in the forward link of wireless networks using orthogonal frequency domain multiple access (OFDMA) technology. But it would be recognized that the invention has a much broader range of applicability.

Considering a downlink of a wireless network, the transmission power allocated to a channel can be varied continuously, however, the bandwidth allocation must be provided in discrete units (in terms of number of subcarriers). For some applications such as VoIP, the bandwidth is fixed and closed loop power control is used to maintain the required frame error rate (FER). Since VoIP users must be served sufficiently fast to maintain low latencies, signaling resources for indicating which voice packet frames are for which user connection can take quite amount of bandwidth and power resources. One conventional solution is to fix the bandwidth resources for an extended period (a sticky assignment) to reduce signaling. But the size of the allocated bandwidth (i.e., the number of subcarriers) remained constant even if the specific system resources are changed. Embodiments of the present invention propose to change the size of the allocated bandwidth each time when bandwidth resources are changed. These changes are in response to path loss and slow fading changes.

Given the rate and FER constraints, the VoIP capacity can be defined as the optimal number of VoIP user connections (or channels) that can be supported under the given available bandwidth and available power resources. In one approach trying to optimize the resources allocation, it is possible that insufficient power is available to maintain all sub-channels at the desired FER. When this occurs the system is declared to be in power outage.

In another approach, instead of fixing the bandwidth allocations and then varying the power allocated to each channel, one can fix the power per active user and determine the bandwidth necessary to maintain each user at the desired FER. In this case, power is never the bottleneck but it is possible to run out of bandwidth leading to a bandwidth outage.

An alternative approach is to allow both bandwidth and power of each VoIP user connection to be varied. Embodiments of the present invention provide a method to choose the power and bandwidth of each user connection by transforming a two-dimensional optimization problem into two one-dimensional optimization problem. In particular, the bandwidth allocation for a specific user connection is firstly assigned a fix value, power dimension is varied to determine an power level indicator while ensuring the transmission under this power level through the user connection meets the required rate criteria and achieve the desired FER. Then bandwidth dimension also is varied subjecting to another criteria which depend on the determined power level indicator. The optimal bandwidth allocation and power allocation are finally determined in response to one more above looped adjustments. Further illustration of this method can be found throughout the specification and in particular by the detail formulations presented below.

Figure 1:
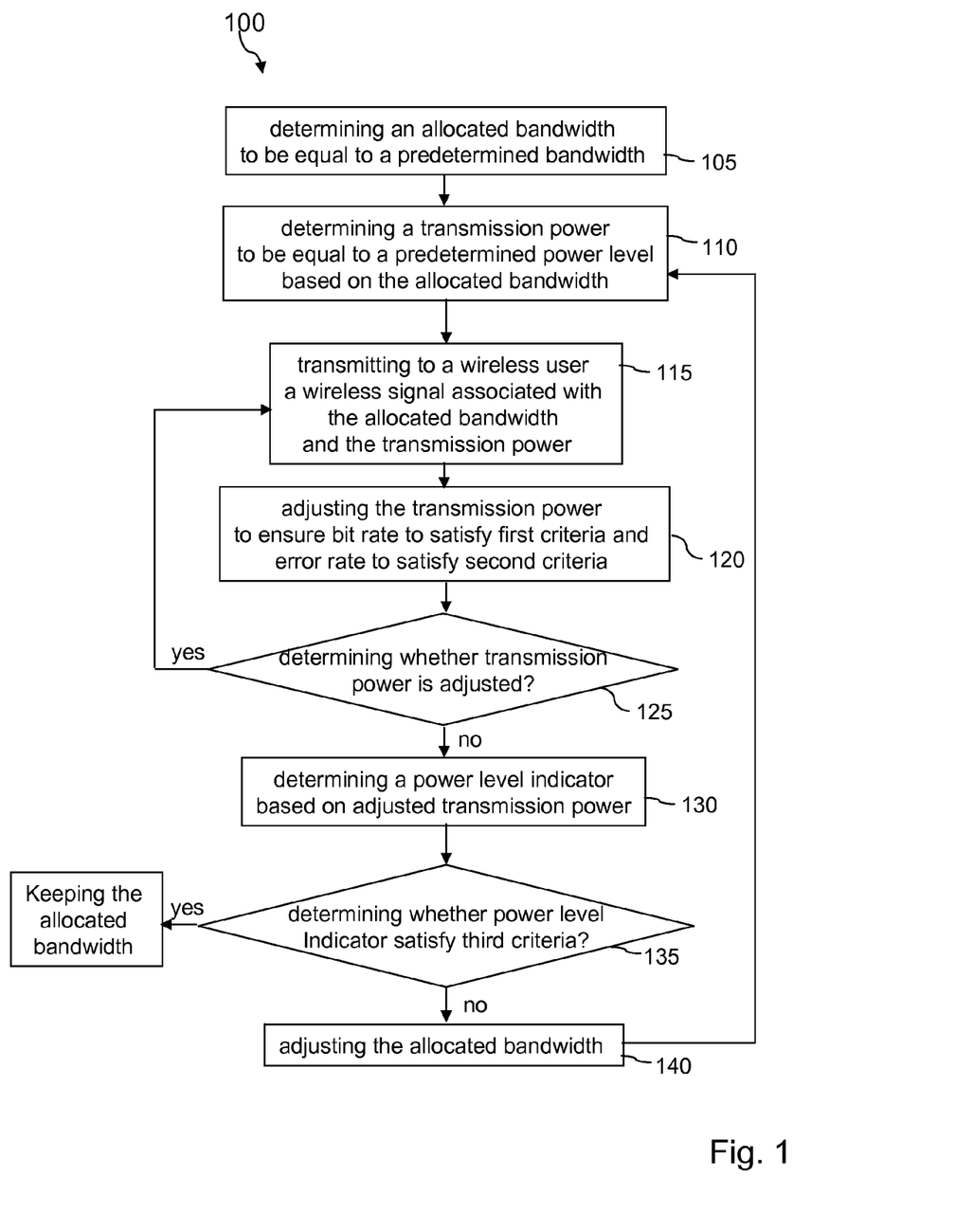
FIG. 1 is a simplified flowchart illustrating a method of allocating bandwidth and power for a user in wireless network downlink according to an embodiment of the present invention.

FIG. 1 is a simplified flowchart illustrating a method of allocating bandwidth and power for a user in wireless network downlink according to an embodiment of the present invention. This diagram is merely an example, which should not unduly limit the scope of the claims herein. One of ordinary skill in the art would recognize other variations, modifications, and alternatives. As shown, the method 100 of allocating a bandwidth and a power for a user connection in wireless network downlink can be outlined as follows:

1. Process 105 for determining an allocated bandwidth to be equal to a predetermined bandwidth;

2. Process 110 for determining a transmission power to be equal to a predetermined power level based on the allocated bandwidth;

3. Process 115 for transmitting to a wireless user a wireless signal associated with the allocated bandwidth and the transmission power;

4. Process 120 for adjusting the transmission power to ensure bit rate to satisfy first criteria and error rate to satisfy second criteria;

5. Process 125 for determining whether the transmission power is adjusted, if yes, continuing process 115 and forward; otherwise, moving to next process;

6. Process 130 for determining a power level indicator based on adjusted transmission power;

7. Process 135 for determining whether the power level indicator satisfies third criteria; if yes, keeping the allocated bandwidth; otherwise, moving to next process;

7. Process 140 for adjusting the allocated bandwidth and moving to process 110 and forward.

These sequences of processes provide a way of performing a method according to an embodiment of the present invention. As shown, the method 100 is a simplified implementation for one user. It can be applied for a plurality of users with an optimized downlink capacity and with both required power and bandwidth optimized for each user based on their channel conditions. Some processes may include multiple sub-processes or steps. Some processes may result in several options so that if one is implemented the others may be removed or vise versa. Of course, there can be variations, modifications, and alternatives.

In one embodiment, it is assumed that the wireless network downlink includes a newly requested VoIP user connection which is provided with a certain allocated bandwidth (Process 105). For example, a b number of subcarriers (e.g., b=16) is assigned for the VoIP user connection by a system associated with the downlink network. The downlink network system includes one or more network components, including a forward link controller, which can be configured to determine how to allocate total bandwidth and power resources available for certain number of VoIP users plus one or more data users associated with the network. Once a request of the VoIP user connection is received by the forward link controller, an initial bandwidth allocation for the VoIP user connection can be performed by the forward link controller based on present available resources and the channel conditions. Of course, there can be variations, modifications, and alternatives.

The initial allocated bandwidth is then fixed, for example, the b number of subcarriers. Subsequently the forward link controller may further determine a proper initial power level $p_{def}$ based on the allocated bandwidth for the user connection and total available bandwidth and power resources. For example, the initial assigned power level $p_{def}$ may be an average available power per available VoIP channel. The total number of available VoIP channels may include the number of channels that are presently supported by the downlink network system and any potential number of channels depending on the available resources which may change dynamically. Additionally, each VoIP channel being supported by the downlink network system should satisfy certain desired VoIP transmission rate and desired FER. In one embodiment, the VoIP user connection currently making request for bandwidth and power resource can be assigned with the initial assigned power level $p_{def}$ for voice signal transmission (Process 110). In another embodiment, the value of $p_{def}$ may change if the allocated bandwidth is different or adjusted. Of course, there can be variations, modifications, and alternatives.

With the allocated bandwidth and assigned transmission power, the downlink network system can send VoIP signals through the VoIP user connection (Process 115). Depending on the location of the wireless user relative to an antenna of the downlink network system as well as other network user conditions, a signal to interference-and-noise ratio (SINR) can be denoted as a channel gain g for the VoIP user which is defined as SINR per unit of transmission power. Given the allocated bandwidth of b subcarriers, the assigned initial transmission power $p_{def}$, and the channel gain g, the bit rate r of the VoIP signals can be determined. As desired, the bit rate r should fast enough to satisfy a requirement for voice audio stream. At the same, as a full rate frame is sent to the VoIP user, a frame error rate (FER) may also be determined between the forward link controller and the VoIP user. If the FER for the frame sent at the rate r does not satisfy a criterion, i.e., a predetermined error-per-second (eps) threshold, the transmission power of the VoIP signals needs to be adjusted (Process 120) from the initial value of $p_{def}$. In one embodiment, the transmission power is adjusted within a closed loop where each adjustment leads to a new transmission power for sending at least a new frame of signals (Process 125). Subsequently, the FER for this new frame transmission can be derived between the forward link controller and the VoIP user.

On the one hand, for a given rate and allocated bandwidth, the FER of frame transmission decreases monotonically with increasing the transmission power. On the other hand, a desired FER does not have to be perfectly error free. For example, the initial transmission power assigned for the VoIP user may be over-estimated so that the FER obtained may be lower than the predetermined eps threshold by a sufficient large margin. Then the transmission power can be reduced by the downlink network system, resulting in a relative higher value of the FER for subsequent frames. Therefore, the process 125 would be a continuous process in which the transmission power may be adjusted for each full rate frame transmission. Through a cycle from Process 115 to 125, the downlink network system continues to monitor the FER and transmission power. A running average of the FERs for all signal frames sent with the assigned and adjusted transmission powers can be obtained. If the downlink network system determines an average FER satisfies the predetermined eps threshold with a minimum transmission power assigned for the VoIP user at the Process 125, the closed loop power control to adjust transmission power for the VoIP user can be finished at this stage. The method 100 then moves to next process.

In another embodiment, the transmission power adjusted during the processes 115-125 is continuously monitored by the network system for each full rate frame transmitted. The system stores the power values for each frame no matter it is adjusted (increase or decrease) or not. As the closed loop power control finishes a power level indicator can be derived by the network system based on the above stored information (Process 130). In one example, the power level indicator may be defined as an average transmission power over all full rate frames sent through the VoIP user connection. In another example, the initial assigned power level $p_{def}$ may be changed to a different power level at last. In certain situation, the transmission power assigned to the VoIP user at last after the closed loop power control may be kept at the initial assigned power level. Of course, there can be variations, modifications, and alternatives.

Once the power level indicator is determined, it can be used by the downlink network system to determine whether it satisfy another predetermined criterion or not and accordingly whether the allocated bandwidth needs to be adjusted (Process 135). In one embodiment, the power level indicator is compared with an upper power threshold $p_{max}$ and a lower power threshold $p_{min}$, the $p_{min}$ has a value less than that of the $p_{max}$. Based on the results of the comparison, the downlink network system is able to determine how to adjust the allocated bandwidth for the user connection. In one embodiment, at the Process 135, if the power level indicator is found to be no greater than the upper power threshold $p_{max}$ nor less than the lower power threshold $p_{min}$, the downlink network system then determines that the power level indicator satisfies the predetermined criterion and no bandwidth adjustment is needed for the VoIP user. The channel condition associated with the allocated bandwidth and the transmission power assigned for the VoIP user may be at least partially optimized in this stage (though the it may change over time). Otherwise, the method 100 moves to next process, i.e., the Process 140.

At the Process 140, the allocated bandwidth for the VoIP user connection is adjusted. In one embodiment, if the power level indicator exceeds the upper power threshold $p_{max}$, the allocated bandwidth for the VoIP user connection will be increased by $b_{inc}$ subcarriers from the initial b subcarriers. In another embodiment, if the power level indicator falls below the lower power threshold $p_{min}$, the allocated bandwidth for the VoIP user connection will be decreased by $b_{dec}$ subcarriers from the initial b subcarriers. As every time after the allocated bandwidth is adjusted, the method 100 would restart from Process 110 to perform power level control. In this case, a proper transmission power, which should be dependent on the present allocated bandwidth, needs to be assigned for the VoIP user connection. Furthermore, subsequent processes 115 and forward should be carried out between the downlink network system and the VoIP user.

In one embodiment, the values of $p_{max}$ and $p_{min}$ should be determined relative to the value of $p_{def}$ and may also be adjusted based on the present bandwidth allocated to the user. These values will also depend on the increment and decrement values for bandwidth. Larger bandwidth changes will require larger changes in power. The increment and decrement parameters, $b_{inc}$ and $b_{dec}$ (numbers of subcarriers), are also dependent on the present bandwidth allocation and should be chosen for an appropriate trade-off between system performance and resource allocation signaling. The system performance is higher when a smaller amount of bandwidth resources are used. The signaling required for resources allocation on the other hand would decrease with increased bandwidth. For example, for given bandwidth and power resources, we would like the system to support a maximized number of users while each user at least can have acceptable performance judged by the bit rate and error rate criteria. Certain simulations can help predeterminations of the parameters of $b_{inc}$ and $b_{dec}$ and $p_{max}$ and $p_{min}$ so that the algorithm applied above based on the method 100 should lead a converged solution providing at least partial optimization for each user and overall system throughput.

In an alternative embodiment, the desired optimization should allow both bandwidth and power of each user connection to be varied at the same time. Then any remaining resources can be allocated to one or more data users associated with the network downlink. In this case, the power and bandwidth of each user connection are chosen with the objective of maximizing the total throughput. Since the throughputs of the VoIP channels are fixed (assuming full rate frame transmissions), this corresponds to choosing power and bandwidth allocations so as to maximize the throughput of the one or more data users. As an example, we consider the case in which a single data user is associated with the downlink network system and scheduled with certain unused bandwidth and power resources.

For each VoIP user i, let $b_i$ denote the allocated bandwidth (number of subcarriers), $p_i$ denote the allocated power and $g_i$ denote the SINR per unit of transmission power, for the user i. Furthermore, we assume that $b_i$ is an effective bandwidth so that we can use the Shannon formula to determine the resulting data rate which represents a theoretical tightest upper bound on the rate for transmission of clean (or arbitrarily low bit error rate) data. In our case, with such a rate the voice signal through the VoIP channel to the user i should satisfy a predetermined FER. Therefore, if each active VoIP channel must maintain such a rate of r bps for full rate frames (i.e., the small percentage of frames that are half and quarter rate is ignored), the rate r can be expressed as $$r = b_i \log(1 + p_i g_i) \quad (1)$$

If the total bandwidth available is denoted by B and the available power is denoted by P, the following two constraints must also hold $$\sum_{i=1}^{N} b_i \leq B \quad \text{and} \quad \sum_{i=1}^{N} p_i \leq P$$

where N denotes the number of active VoIP user connections. Denote the SINR per unit of transmission power of the scheduled data user by g, the data rate R achieved by this data user is $$R = \left(B - \sum_{i=1}^{N} b_i\right) \log\left[1 + \left(P - \sum_{i=1}^{N} p_i\right) g\right] \quad (2)$$

Using Equation (1) the rate R can be presented as a function of only power as following:

$$R(\vec{p}) = \left(B - \sum_{i=1}^{N} \frac{r}{\log(1 + p_i g_i)}\right) \log\left[1 + \left(P - \sum_{i=1}^{N} p_i\right) g\right]$$

where we use $\vec{p}$ to denote the allocated power vector. The optimization problem becomes $$\max_{\vec{p}} R(\vec{p}) \text{ subject to } \sum_{i=1}^{N} p_i \leq P.$$

In one embodiment, if the optimal solution $\vec{p}^*$ is such that $$\sum_{i=1}^{N} p_i^* = P,$$

(i.e. the constraint is binding) then $R(\vec{p}^*)=0$, i.e., if the power constraint is binding, the bandwidth constraint must also be binding. For example, we can increase the bandwidth allocation of each user by a sufficiently small amount (without making the total equal to B) and decrease the allocated power by the amount necessary to maintain the rate constraint. Then both power and bandwidth resources are now available to the data user and hence the achievable data rate is non-zero which is a contradiction. Therefore, the power constraint is correlated with the bandwidth constraint at the optimal point.

Thus, both power and bandwidth resources become exhausted simultaneously. If neither is exhausted and the rate R of the data user is positive then a necessary condition for optimality is that $$\frac{\partial R}{\partial p_i} = 0$$

for all VoIP users i. In one embodiment, $p_i > 0$ since $r > 0$ and furthermore $p_i < P$ power is not exhausted. Therefore, the power variable is never at a boundary point. If the $R(\vec{p})$ can be shown to be a strictly concave function then these conditions are also sufficient for finding a maximum value for it. In one embodiment, instead of showing the Hessian of $R(\vec{p})$ to be negative definite, the $R(\vec{p})$ function can be proven to be strictly concave along each coordinate direction. For example, by using a Cyclic Coordinate Ascent algorithm one can obtain a local maximum of the function. Taking the second derivate along the ith coordinate direction leads to $$\frac{\partial^2 R(\vec{p})}{\partial p_i^2} = -\frac{g^2(B_i - r/\log(1 + p_i g_i))}{(1 + g(P_i - p_i))^2} - \quad (3)$$

$$\frac{2 g g_i r}{(1 + p_i g_i)(1 + g(P_i - p_i))\log(1 + p_i g_i)^2} -$$

$$\frac{2 g_i^2 r \log(1 + g(P_i - p_i))}{(1 + p_i g_i)^2 \log(1 + p_i g_i)^3} - \frac{g_i^2 r \log(1 + g(P_i - p_i))}{(1 + p_i g_i)^2 \log(1 + p_i g_i)^2} < 0$$

where for convenience we define $$B_i \equiv B - \sum_{j \neq i} \frac{r}{\log(1 + p_j g_j)} \quad \text{and} \quad P_i \equiv P - \sum_{j \neq i} p_j$$

Therefore Equation (3) shows that the function is strictly concave along this coordinate direction. In a specific embodiment, the maximum of function $R(\vec{p})$ in this coordinate direction can be obtained by setting the derivative to zero and solving for $p_i$. The operation would lead to a following equation for each ith coordinate, $$\frac{g\left(B_i - \frac{r}{\log(1 + p_i g_i)}\right)}{1 + g(P_i - p_i)} = \frac{g_i r \log(1 + g(P_i - p_i))}{(1 + p_i g_i)\log(1 + p_i g_i)^2} \quad (4)$$

In one embodiment, solving the Equation (4) using numerical methods would lead to the determination of an allocated power $p_i$ for the user i for achieving a local maximum (along the ith coordinate only) of rate R, from which a relatively optimal bandwidth $b_i$ allocated for the user i can also be derived. This algorithm can be applied for all the N number of active VoIP users so that each user can have its own relatively optimized allocation of resources. As an example, method 100 outlined in FIG. 1 provides a direct implementation of this optimization algorithm, in which power is varied and optimized in a first loop and then the bandwidth is varied and optimized in a second loop. Certain embodiments of the invention also teach that this operation may not result in absolute theoretical maximum point for the function of $R(\vec{p})$, but it would advantageously lead to much improved throughput and more efficient system performance than the conventional technique.

In an alternative embodiment, the data rate R can instead be stated in terms of the bandwidth allocations $b_i$ and the optimization performed over a bandwidth vector for all N users. This is done by using Equation (1) to determine $\vec{p}_i$ in terms of $b_i$ and substituting in the data rate function $R(\vec{p})$ (Eq. (2)). Then the above operation can be repeated to find a local maximum for each $b_i$ along the single ith coordinate direction. Subsequently both varied bandwidth and corresponding power can be optimized for each user connection.

Certain embodiments of the present invention can be further illustrated using exemplary computer simulations shown below. In one example, we assume that approximately 25% of the subcarriers in a 5 MHz bandwidth is free for a data user associated with the downlink and a VoIP channel is to be added. The remaining bandwidth is assumed to be used by one or more VoIP users and the associated resources for the one or more VoIP users are fixed. We investigate three cases, (a) the channel gain of the VoIP user is 6 dB less than the data user to be assigned to the remaining bandwidth, (b) the channel gain is equal to that of the data user and (c) the channel gain is 6 dB more than that of the data user. Since the resources allocated to the VoIP users already in the system are fixed, this is a simple one dimensional optimization problem with the rate of the data user being the objective function and the power allocated to the VoIP user being the decision variable.

Figure 2:
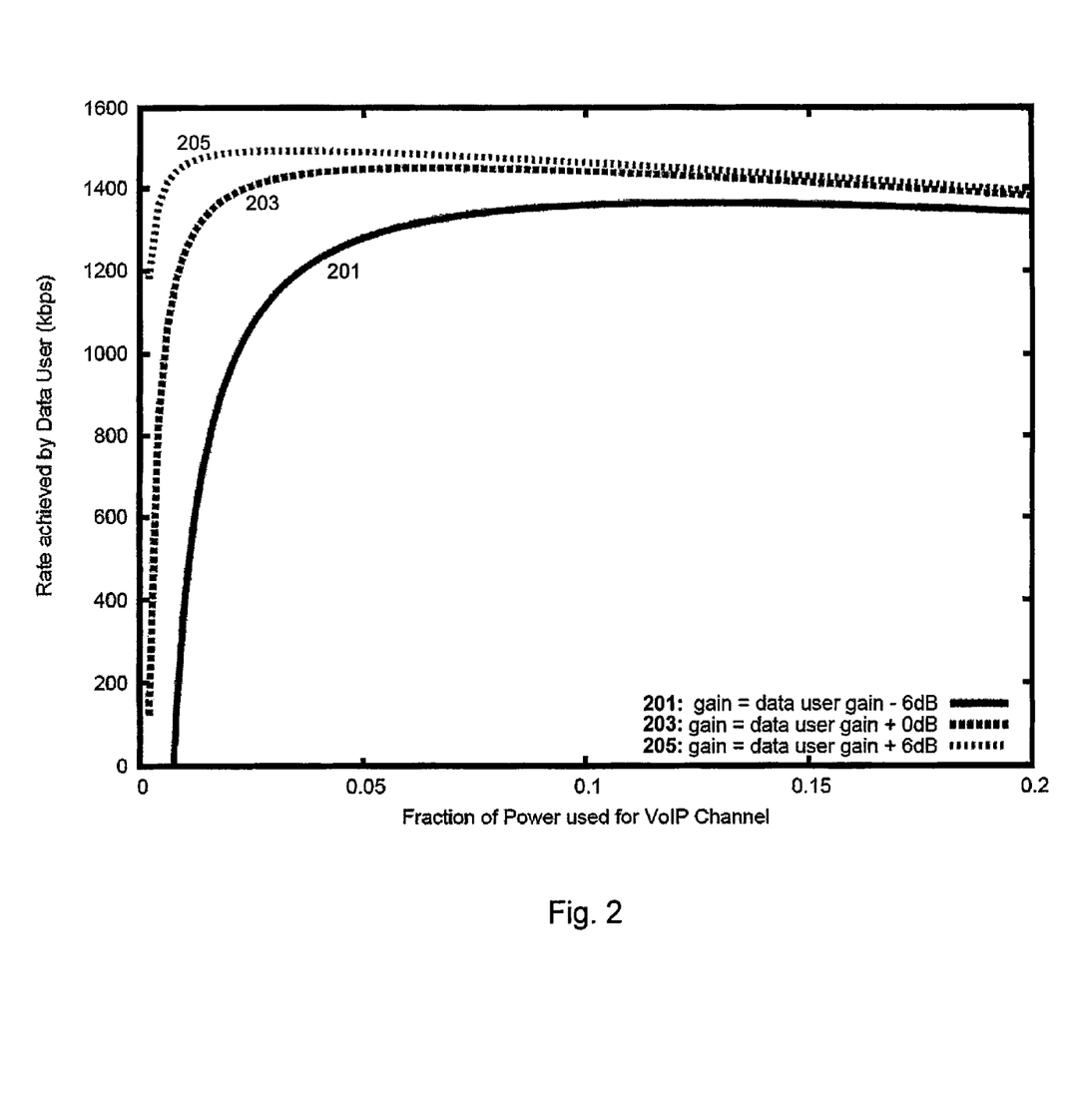
FIG. 2 is an exemplary simulation plot of a data transmission rate as a function of power allocation for various VoIP channel gains according to an embodiment of the present invention.

In one embodiment, FIG. 2 shows a plot of the data rate as a function of the power allocated to the VoIP user for the three cases. This figure is merely an example and an illustration for a very specific case and should not limit the scope of the claims herein. As shown, the objective rate function is concave and that there exists an optimal power point. As the channel gain of the VoIP user decreases, the achievable data rate also decreases since more resources must be used to support the VoIP user.

Figure 3:
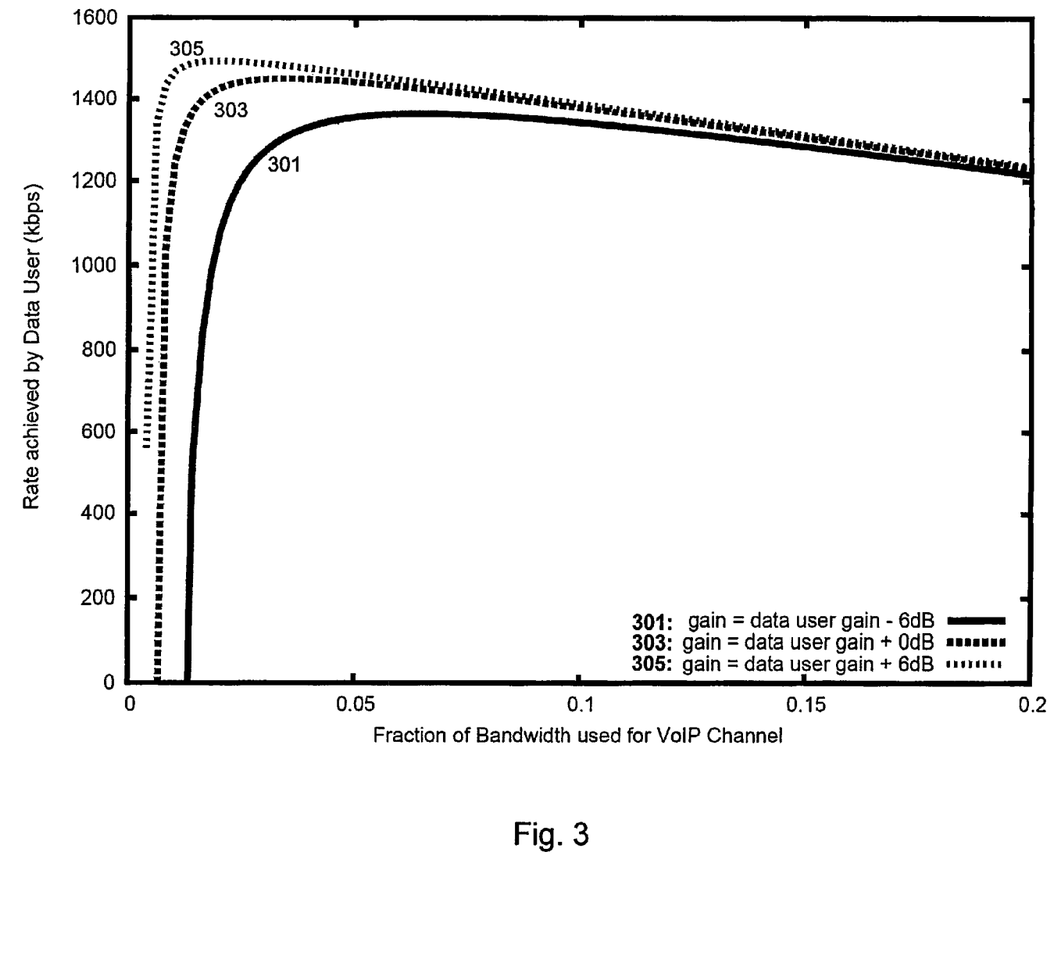
FIG. 3 is an exemplary simulation plot of a data transmission rate as a function of bandwidth allocation for various VoIP channel gains according to an embodiment of the present invention.

As shown in FIG. 2, the optimal power required for the worst channel gain case (curve 201) is only about 3.6 times that of the best gain case (curve 205). If the bandwidth allocated for the VoIP user had instead been kept constant then the power difference for the same two cases would have been 16 times (equal to 12 dB) so that the 12 dB channel gain difference is exactly compensated. This indicates that the optimal bandwidth also varies with the gains. In one embodiment, this can be illustrated in FIG. 3 where the data rate as a function of the bandwidth allocated to the VoIP user for the three cases are plotted. This figure is merely an example and an illustration for a very specific case and should not limit the scope of the claims herein. As shown, the optimal bandwidth for the worst gain case (curve 301) is about 3.2 times that of the best gain case (curve 305). Therefore, as the channel gain of the VoIP user degrades, both power and bandwidth resources required for the VoIP user must be increased to maintain optimality. The data rate of the optimal case is as much as 4% better than that for a case in which a static bandwidth allocation is used for all channel gains. Certain embodiments of the invention provide that this data rate increase due to optimization over a single user can cumulatively applied to multiple VoIP users within the system and hence significantly greater performance gains can be achieved when all the VoIP users are optimized in their bandwidth and power allocations.

In an alternative example, we consider a case where the power and bandwidth resources are fixed and we optimize the number of users that can be supported (the capacity associated with the downlink). As shown in earlier portion of this specification that in the optimal solution if either the power or bandwidth constraints are binding then the other is also binding. Hence in current exemplary case, the optimal solution can be easily obtained by finding the optimal number of users such that both power and bandwidth resources are exhausted. For convenience, the user capacity can take on non-integer values and all users have the same channel SINR per unit of transmission power, g. Of course, this is just a simplified exemplary case for illustrate an embodiment of the invention, one skilled in the art should recognize many variations, alternatives, and modifications. For example, in general each user will take only discrete number of subcarriers and the channel gain g for each user may also vary due to their relative locations and their environmental interferences including other users' characteristics.

For example, we denote the total available bandwidth by B and the total power by P and assume that there are 25 active users. In the static bandwidth case, the 25 active users can be optimally supported (i.e. using all power and bandwidth) and hence $$r = \frac{B}{25} \log\left(1 + \frac{P\bar{g}}{25}\right).$$

Here practical values for P and B are chosen and $g = \bar{g}$. In one embodiment, if $g < \bar{g}$, there is insufficient power to support all 25 users. In this case, if the number of supported users is denoted by $n_s$, then, $$r = \frac{B}{25} \log\left(1 + \frac{Pg}{n_s}\right)$$

and hence $$n_s = \frac{Pg}{\exp(25r/B) - 1}.$$

In another embodiment, if $g > \bar{g}$ then there is excess available power but additional bandwidth is not available. In this case, the capacity is simply $n_s = 25$.

In yet another embodiment, if optimal power and bandwidth is allocated then the number of users n that can be supported is given by $$r = \frac{B}{n} \log\left(1 + \frac{Pg}{n}\right).$$

Solving this equation for n one may determine the user capacity for this exemplary case.

Figure 4:
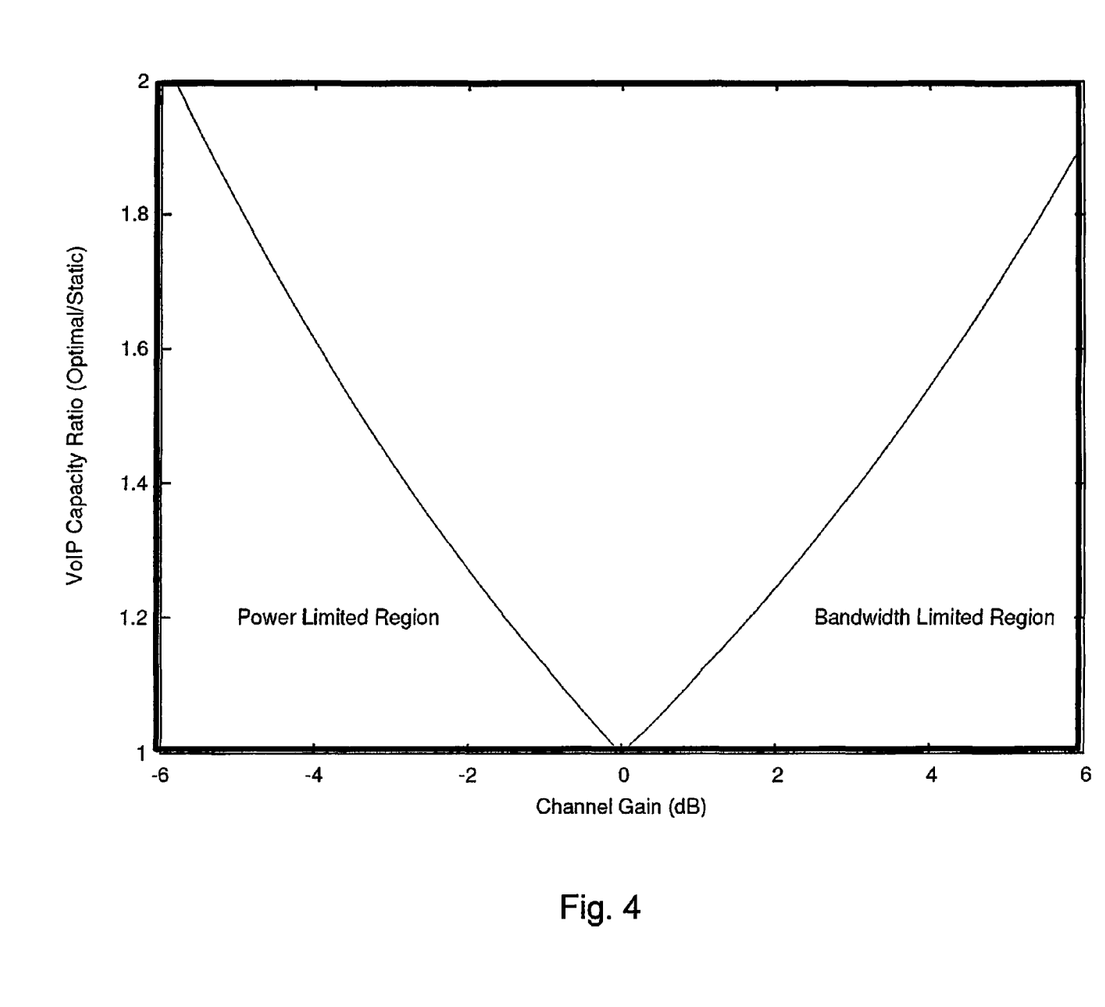
FIG. 4 is an exemplary simulation plot of an optimal-to-static VoIP capacity ratio as a function of VoIP channel gain according to an embodiment of the present invention.

FIG. 4 shows that a plot of the ratio of the user capacities for the optimum case to that for the case of fixed bandwidth channels ($n/n_s$) as a function of the channel gain (assumed to be the same for all users). The channel gain is provided in units of dB relative to $\bar{g}$. As shown, in both power and bandwidth limited regions the optimum allocation of both bandwidth and power can provide significantly higher capacity than that at static case. Of course, this figure is merely an example and an illustration for a very specific case and should not limit the scope of the claims herein.

According certain embodiments, the present invention provides a system of allocating a bandwidth and a power for a wireless user in network downlink. The system includes one or more network components configured to determine an allocated bandwidth to be equal to a first bandwidth, determine a transmission power to be equal to a first power level, transmit to a wireless user a wireless signal associated with the allocated bandwidth and the transmission power, determine a bit rate and an error rate for the transmitted signal, process information associated with the bit rate and the error rate, and determine whether the bit rate satisfies one or more predetermined first criteria and whether the error rate satisfies one or more predetermined second criteria. If the bit rate is determined by the system not to satisfy the one or more predetermined first criteria and/or the error rate is determined not to satisfy the one or more predetermined second criteria, the system further adjusts the transmission power from the first power level to a second power level so that the bit rate is determined to satisfy the one or more predetermined first criteria and the error rate is determined to satisfy the one or more predetermined second criteria. Additionally, the system processes information associated with the adjusted transmission power, determines a power level indicator based on at least information associated with the adjusted transmission power, processes information associated with the power level indicator, and determine whether the power level indicator satisfies one or more predetermined third criteria. If the power level indicator is determined by the system not to satisfy the one or more predetermined third criteria, the system further adjusts the allocated bandwidth from the first bandwidth to a second bandwidth for the wireless user. If the power level indicator is determined by the system to satisfy the one or more predetermined third criteria, the system shall keeps the allocated bandwidth equal to the first bandwidth. For example, the system is configured to implement the method 100 for optimally allocating both bandwidth and power resources for each of VoIP channels. In particular, the system is a wireless OFDMA downlink network system that is configured to support one or more data users and a plurality of VoIP users with optimal allocation of both bandwidth and power resources. In one embodiment, the one or more network components include a forward link controller.

As discussed above, one or ordinary skilled in the art may recognize that the particular naming and division of the downlink network system, voice user, user connection, forward link controller, data user, and other aspects are not mandatory or significant. The mechanisms that implement the invention or its features may have different names, divisions, and/or formats. Additionally, one or ordinary skilled in the art may recognize that voice signals, data signals, transmission powers, bit rate, frames, error rate, bandwidths, and other aspects of the invention can be implemented as software, hardware, firmware or any combination of the three.

Of course, whenever a component of the present invention is implemented as software, the component can be implemented as a standalone program, or part of a larger program, or a first plurality of separate programs, or a statically or dynamically linked library, or a kernel loadable module, or a device driver, and/or in every and any other way known now or in the future to those skill in the art of computer programming. Additionally, the present invention is in no way limited to implementation in any specific programming language, or for any specific operating system or environment.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of allocating a bandwidth and a power for a wireless user, the method comprising:
   determining an allocated bandwidth to be equal to a first bandwidth;
   determining a transmission power to be equal to a first power level;
   transmitting to a wireless user a wireless signal associated with the allocated bandwidth and the transmission power;
   determining a bit rate and an error rate for the transmitted signal;
   processing information associated with the bit rate and the error rate;
   determining whether the bit rate satisfies one or more predetermined first criteria and whether the error rate satisfies one or more predetermined second criteria;
   if the bit rate is determined not to satisfy the one or more predetermined first criteria and/or the error rate is determined not to satisfy the one or more predetermined second criteria,
      adjusting the transmission power from the first power level to a second power level so that the bit rate is determined to satisfy the one or more predetermined first criteria and the error rate is determined to satisfy the one or more predetermined second criteria;
      processing information associated with the adjusted transmission power;
      determining a power level indicator based on at least information associated with the adjusted transmission power;
      processing information associated with the power level indicator;
      determining whether the power level indicator satisfies one or more predetermined third criteria;
      if the power level indicator is determined not to satisfy the one or more predetermined third criteria, adjusting the allocated bandwidth from the first bandwidth to a second bandwidth for the wireless user;
      if the power level indicator is determined to satisfy the one or more predetermined third criteria, keeping the allocated bandwidth equal to the first bandwidth.

2. The method of claim 1, and further comprising:
   if the bit rate is determined to satisfy the one or more predetermined first criteria and the error rate is determined to satisfy the one or more predetermined second criteria,
      processing information associated with the transmission power being equal to the first power level;
      determining the power level indicator based on at least information associated with the transmission power;
      processing information associated with the power level indicator;
      determining whether the power level indicator satisfies the one or more predetermined third criteria;
      if the power level indicator is determined not to satisfy the one or more predetermined third criteria, adjusting the allocated bandwidth from the first bandwidth to a third bandwidth for the wireless user;
      if the power level indicator is determined to satisfy the one or more predetermined third criteria, keeping the allocated bandwidth equal to the first bandwidth.

3. The method of claim 1 wherein the process for determining whether the bit rate satisfies one or more predetermined first criteria comprises determining the bit rate not to satisfy the one or more predetermined first criteria if the bit rate is less than a predetermined constant bit per second depending on a user type and an application type.

4. The method of claim 1 wherein the process for determining whether the error rate satisfies one or more predetermined second criteria comprises determining the error rate not to satisfy the one or more predetermined second criteria if the error rate is greater than a predetermined frame error rate threshold.

5. The method of claim 4 wherein the process for adjusting the transmission power from a first power level to a second power level comprises using a closed loop power control to find a minimum power level for a given rate and a given signal to interference-and-noise ratio per unit of transmission power so that the error rate is no greater than the predetermined frame error rate threshold.

6. The method of claim 5 wherein the process for determining a power level indicator based on at least information associated with the adjusted transmission power comprises monitoring the transmission power during the closed loop power control for the wireless user to calculate an average transmission power.

7. The method of claim 1 wherein the first power level is dependent on the allocated bandwidth for the wireless user.

8. The method of claim 7 wherein the first power level may be an average transmission power available per user if multiple users of same type are included.

9. The method of claim 1 wherein the process for determining whether the power level indicator satisfies one or more predetermined third criteria comprises determining the power level indicator not to satisfy the one or more predetermined third criteria if the power level indicator is not greater than a predetermined upper power threshold and not less than a predetermined lower power threshold, the lower power threshold being less than the higher power threshold.

10. The method of claim 9 wherein the process for adjusting the allocated bandwidth from the first bandwidth to a second bandwidth comprises adding a predetermined first number of subcarriers to the first bandwidth if the power level indicator is determined to exceed the upper power threshold.

11. The method of claim 9 wherein the process for adjusting the allocated bandwidth from the first bandwidth to a second bandwidth comprises subtracting a predetermined second number of subcarriers from the first bandwidth if the power level indicator is determined to fall below the lower power threshold.

12. A method of allocating a bandwidth and a power for a user connection, the method comprising:
providing a wireless network downlink with a total bandwidth and a total available power, the downlink including one or more user connections capable of transmitting one or more wireless signals at a constant rate;
assigning one or more transmission powers respectively for the one or more user connections, a sum of the one or more transmission powers being no greater than the total available power;
determining one or more bandwidth allocations respectively for the one or more user connections, each of the one or more bandwidth allocations being derived from a corresponding transmission power associated with the constant rate, a channel-gain for the corresponding user connection, and an error rate no greater than a predetermined criterion;
calculating a remaining power by subtracting a sum of the one or more transmission powers from the total available power;
calculating a remaining bandwidth by subtracting a sum of the one or more bandwidth allocations from the total bandwidth;
deriving a rate for transmitting a data signal through an additional connection other than the one or more user connections, the rate being associated with at least the remaining bandwidth and the remaining power;
determining the one or more transmission powers respectively to be one or more first power levels associated with one or more first bandwidth allocations for the one or more user connections so that a maximum value of the rate is obtained subjecting conditions that a sum of the one or more first power levels is no greater than the total available power and a sum of the one or more first bandwidth allocations is no greater than the total bandwidth.

13. The method of claim 12 wherein each of the one or more user connections capable of transmitting one or more wireless signals at a constant rate is a voice over IP (VoIP) channel.

14. The method of claim 12 wherein the additional connection other than the one or more user connections is a channel for data signal transmission.

15. The method of claim 12 wherein the predetermined criterion for the error rate is a frame error rate threshold required for a VoIP channel.

16. The method of claim 12, further comprising
determining the remaining power by subtracting a sum of the one or more first power levels from the total available power;
determining the remaining bandwidth by subtracting a sum of the one or more first bandwidth allocations from the total bandwidth;
providing the wireless network downlink with the remaining power and the remaining bandwidth available for one or more additional user connections, the one or more additional user connections being the same type as the one or more user connections.

17. A system of allocating a bandwidth and a power for a wireless user in network downlink, the system comprising:
one or more components configured to:
determine an allocated bandwidth to be equal to a first bandwidth;
determine a transmission power to be equal to a first power level;
transmit to a wireless user a wireless signal associated with the allocated bandwidth and the transmission power;
determine a bit rate and an error rate for the transmitted signal;
process information associated with the bit rate and the error rate;
determine whether the bit rate satisfies one or more predetermined first criteria and whether the error rate satisfies one or more predetermined second criteria;
if the bit rate is determined not to satisfy the one or more predetermined first criteria and/or the error rate is determined not to satisfy the one or more predetermined second criteria,
adjust the transmission power from the first power level to a second power level so that the bit rate is determined to satisfy the one or more predetermined first criteria and the error rate is determined to satisfy the one or more predetermined second criteria;
process information associated with the adjusted transmission power;

determine a power level indicator based on at least information associated with the adjusted transmission power;

process information associated with the power level indicator;

determine whether the power level indicator satisfies one or more predetermined third criteria;

if the power level indicator is determined not to satisfy the one or more predetermined third criteria, adjust the allocated bandwidth from the first bandwidth to a second bandwidth for the wireless user;

if the power level indicator is determined to satisfy the one or more predetermined third criteria, keep the allocated bandwidth equal to the first bandwidth.

18. The system of claim 17 wherein the one or more network components are further configured to process information associated with the transmission power being equal to the first power level if the bit rate is determined to satisfy the one or more predetermined first criteria and the error rate is determined to satisfy the one or more predetermined second criteria;

determine the power level indicator based on at least information associated with the transmission power;

process information associated with the power level indicator;

determine whether the power level indicator satisfies the one or more predetermined third criteria;

if the power level indicator is determined not to satisfy the one or more predetermined third criteria, adjust the allocated bandwidth from the first bandwidth to a third bandwidth for the wireless user;

if the power level indicator is determined to satisfy the one or more predetermined third criteria, keep the allocated bandwidth equal to the first bandwidth.

19. The system of claim 18 wherein the first power level is dependent on the allocated bandwidth for the wireless user.

20. The system of claim 17 wherein the wireless user is a voice user configured to receive one or more voice signals at a constant bit rate from the system based on voice-over-IP (VoIP) protocol.

21. The system of claim 17 wherein the one or more predetermined first criteria comprise a preset constant bit per second threshold required to transmit voice signal over a VoIP channel.

22. The system of claim 17 wherein the one or more predetermined second criteria comprise a preset frame error rate threshold for full rate transmission of one or more voice signals over a VoIP channel.

23. The system of claim 17 wherein the one or more network components comprise a forward link controller.

24. The system of claim 23 wherein the power level indicator is an average transmission power over all adjusted transmission powers monitored by the forward link controller during a closed loop power control.

25. The system of claim 24 wherein the one or more predetermined third criteria comprise an upper power threshold and a lower power threshold preset by the forward link controller to increase the allocated bandwidth from the first bandwidth to a second bandwidth for the user by a predetermined first number of subcarriers when the power level indicator is determined to exceed the upper power threshold; or decrease the allocated bandwidth from the first bandwidth to a second bandwidth for the user by a predetermined second number of subcarriers when the power level indicator is determined to fall below the lower power threshold; or maintain the allocated bandwidth to be the first bandwidth for the user when the power level indicator is determined to be no greater than the upper power threshold and no less than the lower power threshold.

26. The system of claim 25 wherein the upper power threshold and the lower power threshold are determined relative to the first power level and may be adjusted based on the allocated bandwidth.

27. The system of claim 25 wherein the first number and the second number of subcarriers are dependent on the allocated bandwidth allocated.

* * * * *